United States Patent [19]
De Winter

[11] Patent Number: 6,101,046
[45] Date of Patent: Aug. 8, 2000

[54] CYLINDRICAL MOUNT FOR OPTICAL COMPONENTS OF A VARIABLE-POWER OBJECTIVE

[75] Inventor: Andrè De Winter, Penetang, Canada

[73] Assignee: Leica Camera AG, Solms, Germany

[21] Appl. No.: 09/384,028

[22] Filed: Aug. 26, 1999

[30] Foreign Application Priority Data

Sep. 7, 1998 [DE] Germany .......................... 198 40 775

[51] Int. Cl.[7] .................................................. G02B 15/14
[52] U.S. Cl. .......................................... 359/699; 359/695
[58] Field of Search ................................... 359/694, 699, 359/700, 819, 823, 695

[56] References Cited

U.S. PATENT DOCUMENTS

| | | | |
|---|---|---|---|
| 4,993,815 | 2/1991 | Yamazaki et al. | 359/699 |
| 5,675,444 | 10/1997 | Ueyama et al. | 359/824 |
| 5,748,390 | 5/1998 | Koiwai et al. | 359/811 |

*Primary Examiner*—Georgia Epps
*Assistant Examiner*—Ricky Mack

*Attorney, Agent, or Firm*—Foley & Lardner

[57] ABSTRACT

A cylindrical mount (1) for optical components of a variable-power objective, includes an inner straight-line guide (2, 3), with a cam control (13) which is capable of being actuated via a rotary ring (15) arranged on the outside of the mount and which is intended for the adjustment of carriers, (4, 4', 5) for lenses or lens groups relative to one another in order to change the focal length. A further rotary ring (19) is provided for adjusting a holder (10) for lenses or lens groups for setting the focus of the objective. The holder (10) is arranged on a linear guide (8, 9) which is adjustable in the direction of the optical axis (24) and which is fastened to a carrier (4') displaceable with the change in focal length. The further rotary ring (19) has, on its inner cylindrical surface, a cam carrier (18) which is held displaceably in the direction of the optical axis (24) on the cylindrical surface. The holder (10) has a transmission element (20) which is in engagement with the cam carrier (18), and the cam carrier (18) possesses a guide element (17) which points inward in the radial direction and which is in engagement with a guide slot (16) arranged perpendicularly to the optical axis (24) of the objective on the outer cylindrical surface of the carrier (4').

8 Claims, 1 Drawing Sheet

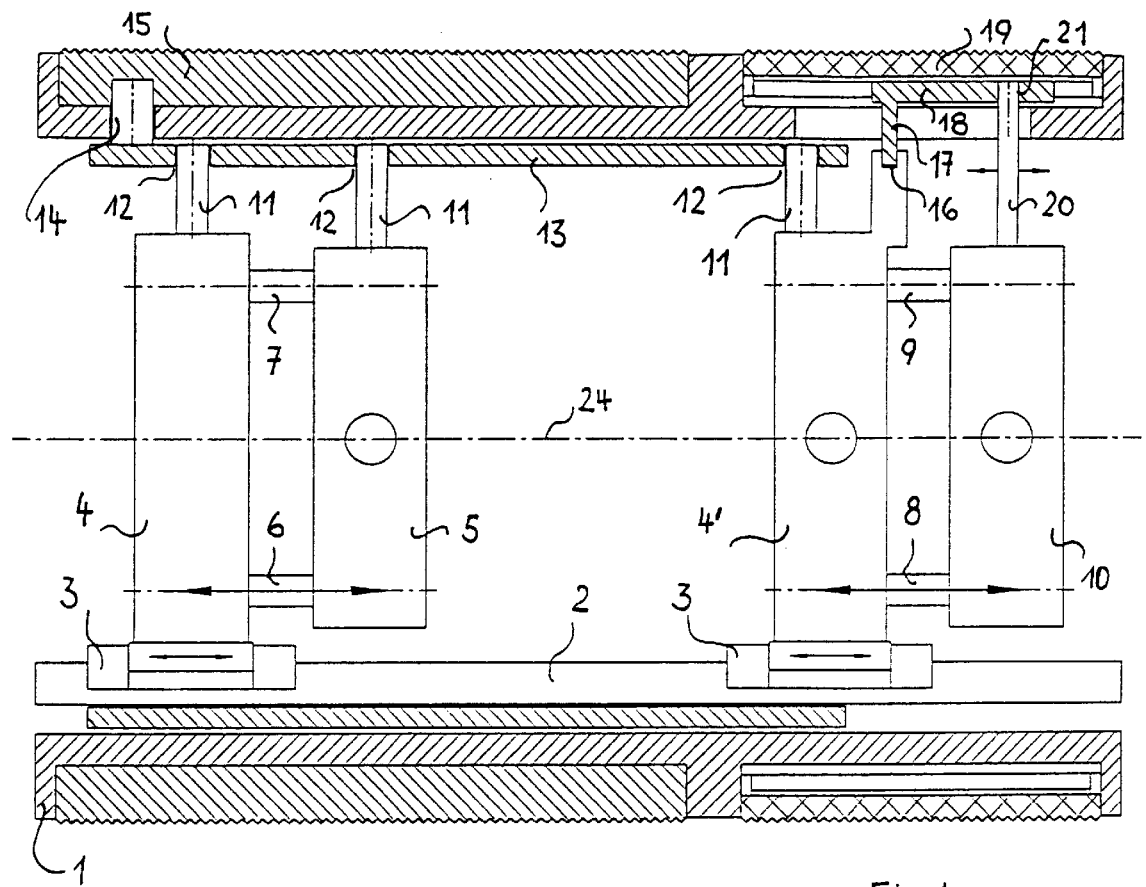
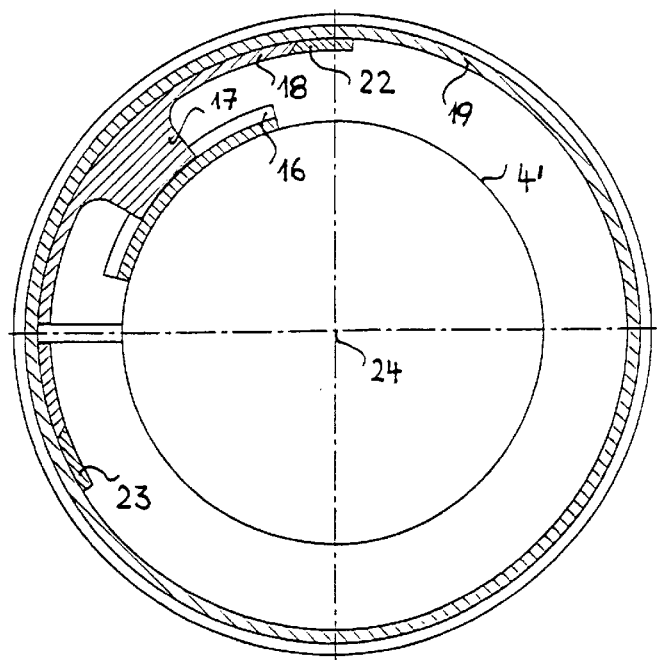
Fig. 1
Fig. 2

CYLINDRICAL MOUNT FOR OPTICAL COMPONENTS OF A VARIABLE-POWER OBJECTIVE

BACKGROUND OF THE INVENTION

1. Field of the Invention

The invention relates to a cylindrical mount for optical components of a variable-power objective.

2. Related Art

Many versions of mounts for variable-power objectives, such as zoom lenses, are known. In them, a plurality of lenses or lens groups are held in different carriers and are displaced relative to one another along the optical axis of the objective in order to change the focal length. Thus, in variable-power (or zoom) objectives, a change in focal length of the objective results in variable magnification of the object in the image plane.

In addition, it is often necessary to displace individual lenses or lens groups in order to set the focus of the objective, which is independent of changing the focal length. A zoom objective in a position of a selected focal length setting should be adjusted or focussed to the correct distance of the object for sharp imaging in the image plane.

As may be gathered, for example, from U.S. Pat. No. 5,675,444, the displacement of the lenses or lens groups relative to one another normally takes place via a cam control which is driven by an outer rotary ring. In this case, the carrier of the lenses or lens groups engages via a pin into the cam track of a rotatably mounted cam carrier and is simultaneously guided in the axial direction in a straight-line guide. U.S. Pat. No. 5,748,390 discloses rod systems for guidance in a straight line, on which the lens carriers run and which are fastened to the mount. Further rod systems may also be fastened to one of the adjustable lens carriers. This ensures that, in the event of displacement, the lenses are not rotated, so as to avoid optical imaging errors due to decentering. It is also known to separate the cam control and the straight-line guide from one another, in which case separate straight-line guide elements for the carriers of the lenses are provided in the mount cylinder.

In the known mounts, the focus setting movement is transmitted via a helical gearing, in which the mount of the lenses or lens components to be displaced is rotated. Depending on the pitch of the driving worm, the angle of rotation is generally not too great, so that any possible imaging errors due to the rotation of the optical surfaces relative to the fixed lens surfaces are often acceptable. However, for example, some sluggishness in the movement of the worm is unavoidable.

Front lens groups, onto which filters and diaphragms are also attached, are frequently used for focussing. In order to use polarizing filters and noncircular diaphragms, it is then necessary to choose a different type of fastening, so that their orientation can be maintained when the focus is being set.

SUMMARY OF THE INVENTION

An object on which the invention is based is, therefore, to provide a device for focus setting, which allows axial adjustment of the lens components without rotation. The focus setting is not to change in the event of a subsequent focal length setting and nevertheless is to be very smooth.

In a cylindrical mount, this object can be achieved, according to one aspect of the present invention, by an inner straight-line guide, with a cam control which is capable of being actuated via a rotary ring arranged on the outside of the mount and which is intended for the adjustment of carriers, for lenses or lens groups relative to one another in order to change the focal length. A further rotary ring is provided for adjusting a holder for lenses or lens groups for setting the focus of the objective. The holder is arranged on a linear guide which is adjustable in the direction of the optical axis and which is fastened to a carrier displaceable with the change in focal length. The further rotary ring has, on its inner cylindrical surface, a cam carrier which is held displaceably in the direction of the optical axis on the cylindrical surface. The holder has a transmission element which is in engagement with the cam carrier, and the cam carrier possesses a guide element which points inward in the radial direction and which is in engagement with a guide slot arranged perpendicularly to the optical axis of the objective on the outer cylindrical surface of the carrier.

Further features of the invention form the subject matter of the claims and will be explained in more detail, in conjunction with further advantages of the invention, with reference to an exemplary embodiment.

BRIEF DESCRIPTION OF THE DRAWINGS

Embodiments of the invention, serving as an examples, are illustrated schematically in the drawings, in which:

FIG. 1 shows a longitudinal section through the mount, and

FIG. 2 shows a cross section through the mount.

DETAILED DESCRIPTION OF THE EXEMPLARY EMBODIMENTS

FIG. 1 illustrates a cylindrical mount 1, for example, for a camera, which has an inner straight-line guide. The straight-line guide comprises a rail 2, on which ball-mounted slides 3 slide. Fastened to the slides 3 are carriers 4,4', into which lenses or lens groups, not illustrated, are inserted. A further carrier 5 is displaceably mounted, via ball bearings not illustrated, on the carrier 4 on two rod guides 6, 7. For setting the focus, a holder 10 for lenses or lens groups, likewise not illustrated, is displaceably mounted on the carrier 4' via further rod guides 8, 9 and ball bearings. The rod guides, located diametrically opposite one another, bring about play-free and extremely smooth straight-line guidance to the carrier 5 and the holder 10.

The carriers 4, 4', 5 engage, with the pins 11 fastened to them, into cam guides 12 which are milled into a cylinder 13. The cylinder 13 is connected via a pin 14 to a rotary ring 15 which is rotatably mounted on the mount 1. When the rotary ring 15 is actuated, the cylinder 13 is co-rotated and, by virtue of the gradient of the milled-in cam guides 12, transmits said gradient to the carriers 4, 4', 5 as an axial displacement along the rail 2 or the rod guides 6, 7, 8, 9. Each of the carriers 4, 4', 5 may be provided with its own form of the cam guide 12, so that each executes its own displacement movement.

Fastened to the outer cylindrical part of the carrier 4' is a guide slot 16. Into this engages a guide element which is designed as a flat web 17 and which is fastened to a cam carrier 18. The cam carrier 18 is held displaceably in the axial direction on the inner cylindrical surface of a further rotary ring 19. The holder 10 has a pin 20 which is in engagement with a cam track 21 in the cam carrier 18.

During axial adjustment of the carrier 4', via the cam guide 12 assigned to it, in order to change the focal length, carrier 4' also displaces the holder 10 in the same way by virtue of the axially rigid coupling of the guide slot 16 to the web 17, cam carrier 18 and pin 20. When the rotary ring 19 is actuated only the cam carrier 18 is co-rotated and via the gradient of the cam guide 21 and the pin 20 exerts an axial adjusting force on the holder 10. In this case, the axial position of the cam carrier 18 is maintained via the web 17 and the guide slot 16. Rotation of the holder 10 about the optical axis 24 is ruled out by the rod guides 8, 9. On account of the smooth movement of the axially adjustable focussing component, a motor drive (not shown) may also be used, instead of the manually actuable rotary ring 19, so that the solution according to the invention can also be used, in particular, for auto-focus objectives.

FIG. 2 illustrates how the cam carrier 18 is held on the inner cylindrical surface of the rotary ring 19 in two dovetail guides 22, 23 which extend in the axial direction. Flat web 17, which slides in the guide slot 16, is integrally formed on the cam carrier 18. The guide slot 16 is fastened to the carrier 4'.

Although the invention has been described above by reference to certain embodiments of the invention, the invention is not limited to the embodiments described above. Modifications and variations of the embodiments described above will occur to those skilled in the art, in light of the above teachings.

German Patent Application No. 198 40 775.0, filed Sep. 7, 1998, including the specification, the drawings, the claims, and the abstract, upon which this application is based, is incorporated herein by reference in its entirety.

What is claimed is:

1. A cylindrical mount for optical components of a variable-power objective, comprising:

an inner straight-line guide having a cam control actuatable using a first rotary ring arranged on an outside of the mount;

a first adjustable carrier for carrying a first optical element; and a second rotary ring for adjusting a holder of a second optical element for setting a focus of the variable-power objective, wherein said holder is coupled to a linear guide that is adjustable in the direction of an optical axis and which is coupled to a second adjustable carrier for carrying an additional optical element that is displaceable with a change in focal length, wherein said second rotary ring further includes, on its inner cylindrical surface, a cam carrier that is held displaceably in the direction of said optical axis on a cylindrical surface, wherein said holder includes a transmission element in engagement with said cam carrier, and wherein said cam carrier includes a guide element that points inward in a radial direction and which is in engagement with a guide slot arranged perpendicularly to said optical axis on an outer cylindrical surface of said second adjustable carrier.

2. The cylindrical mount according to claim 1, wherein said first adjustable carrier comprises a plurality of carriers of lenses or lens groups adjustable relative to one another in order to change said focal length.

3. The cylindrical mount according to claim 1, wherein said guide element is a flat web.

4. The cylindrical mount according to claim 1, wherein said cam carrier is held in a dovetail guide.

5. The cylindrical mount according to claim 1, wherein an axial adjustment of said carriers is accomplished without a rotation of said optical elements.

6. A cylindrical mount for optical components of a variable-power objective, comprising:

an inner straight-line guide;

a cam control which is actuatable via a first rotary ring arranged on the outside of the mount and which is intended for the adjustment of first, second and third carriers for lenses or lens groups relative to one another in order to change the focal length; and a second rotary ring for adjusting a holder for lenses or lens groups for setting the focus of the objective, wherein the holder is arranged on a linear guide which is adjustable in the direction of the optical axis and which is fastened to the second carrier displaceable with the change in focal length, the second rotary ring has, on its inner cylindrical surface, a cam carrier which is held displaceably in the direction of the optical axis on the cylindrical surface, the holder has a transmission element which is in engagement with the cam carrier, and the cam carrier possesses a guide element which points inward in the radial direction and which is in engagement with a guide slot arranged perpendicularly to the optical axis of the objective on the outer cylindrical surface of the second carrier.

7. The cylindrical mount as claimed in claim 6, wherein the guide element arranged on the cam carrier is a flat web.

8. The cylindrical mount as claimed in claim 6, wherein the cam carrier displaceable in the direction of the optical axis is held in a dovetail guide.

* * * * *